United States Patent
Buttler et al.

(10) Patent No.: US 11,885,662 B2
(45) Date of Patent: *Jan. 30, 2024

(54) METHOD OF DETERMINING TOTAL PROVE TIME

(71) Applicant: MICRO MOTION, INC., Boulder, CO (US)

(72) Inventors: Marc Allan Buttler, Erie, CO (US); Andrew Timothy Patten, Boulder, CO (US)

(73) Assignee: MICRO MOTION, INC., Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/257,742

(22) PCT Filed: Jul. 8, 2019

(86) PCT No.: PCT/US2019/040840
§ 371 (c)(1),
(2) Date: Jan. 4, 2021

(87) PCT Pub. No.: WO2020/014140
PCT Pub. Date: Jan. 16, 2020

(65) Prior Publication Data
US 2021/0285809 A1    Sep. 16, 2021

Related U.S. Application Data

(60) Provisional application No. 62/696,664, filed on Jul. 11, 2018.

(51) Int. Cl.
*G01F 25/10* (2022.01)
*G01F 1/84* (2006.01)
*G01N 9/00* (2006.01)

(52) U.S. Cl.
CPC ............ *G01F 25/10* (2022.01); *G01F 1/8422* (2013.01); *G01F 1/8477* (2013.01); *G01N 9/002* (2013.01); *G01N 2009/006* (2013.01)

(58) Field of Classification Search
CPC ...... G01F 25/10; G01F 1/8422; G01F 1/8477; G01F 1/84; G01N 9/002; G01N 2009/006
See application file for complete search history.

(56) References Cited

U.S. PATENT DOCUMENTS 5,317,895 A    6/1994  Ogawa et al.
2003/0233860 A1*  12/2003  Deane .................... G01F 1/668
                                                73/1.16

(Continued)

FOREIGN PATENT DOCUMENTS

WO    2004001349 A1    12/2003

OTHER PUBLICATIONS

Otomanski, P. et al., "The Evaluation of Expanded Uncertainty of Measurement Results in Direct Measurements Using the LabVIEW Environment," 2008 (Year: 2008).*

(Continued)

*Primary Examiner* — Matthew G Marini
*Assistant Examiner* — Leo T Hinze
(74) *Attorney, Agent, or Firm* — The Ollila Law Group LLC

(57) ABSTRACT

Methods for operating a flowmeter diagnostic tool are provided that comprise interfacing the diagnostic tool with a flowmeter (5) sensor assembly (10). A base prover volume (BPV), a desired number of passes per run, and/or a maximum number of allowed runs may be input into the diagnostic tool. Flowmeter data is received. An estimated total prove time (TPT) necessary to pass a predetermined repeatability requirement, an estimated minimum number of runs (Continued)

needed to achieve the calculated TPT, and/or an estimated minimum BPV may be calculated.

20 Claims, 4 Drawing Sheets

(56) References Cited

U.S. PATENT DOCUMENTS

| | | |
|---|---|---|
| 2008/0083262 A1 | 4/2008 | Augenstein et al. |
| 2008/0189054 A1* | 8/2008 | McAnally ............... G01F 25/10 |
| | | 702/45 |
| 2009/0013753 A1 | 1/2009 | Bell et al. |
| 2016/0245074 A1* | 8/2016 | Schollenberger ....... E21B 47/10 |

OTHER PUBLICATIONS

Emerson: "Guidelines for the Selection and Operation of Provers with Micro Motion ELITE Coriolis Flow Meters", Reference Guide MC-001597 Rev E, Jan. 2018 (Jan. 2018), pp. 1-6, XP055621813, Retrieved from the Internet: URL:https:// www.emerson.com/documents/automation/guide-guidelines-for- selection-operation-of-provers-elite-coriolis-flow-meters-micro-motion-en-3845090.pdf [retrieved on Sep. 12, 2019].

* cited by examiner

METHOD OF DETERMINING TOTAL PROVE TIME

TECHNICAL FIELD

The embodiments described below relate to methods of determining the total prove time necessary for repeatability requirements.

BACKGROUND

Custody transfer and other fiscal measurements of liquid products that are sold by total metered quantity in either volume or mass units are often required to be validated in situ by a process commonly referred to as meter proving. The practice of meter proving is generally well established in industry. One well-known standard, for example without limitation, that describes the meter proving is the American Petroleum Institute (API) Manual of Petroleum Measurement Standards (MPMS) Chapter 4.8.

It is critical to the success of organizations which ascribe to particular standards within trade contracts and other binding practices that the equipment they use to measure liquid flow for custody transfer applications will consistently meet or exceed the criteria for repeatability that are described within the agreed-upon standards. By doing so, the data from a proving event will result in acceptable levels of uncertainty for the final average meter factor.

Total Prove Time (TPT) is the time needed to pass proving repeatability requirements as noted above. TPT is also used as a tool for sizing and selection of a prover during design phase of an installation.

Coriolis flow meters are often used to measure mass flow rate, density, and other information for flowing materials. The flowing materials can include liquids, gases, combined liquids and gases, solids suspended in liquids, and liquids including gases and suspended solids. For example, flow meters are widely used in well production and refining of petroleum and petroleum products. A flow meter can be used to determine well production by measuring a flow rate (i.e., by measuring a mass flow through the flow meter) and can even be used to determine the relative proportions of the gas and liquid components of a flow.

Problems can arise when Coriolis meters are being used in applications where proving is performed, and a flow meter is experiencing unstable flow rates and "noisy" flows. The level of noise experienced in service can be predicted to some degree based on past observations of typical installations, but there are too many overall system design variables that can impact flow noise and instability to be entirely sure what the actual variation in flow rate will be once the installation is complete and the system is in service and operating under various sets of conditions and flow rates.

Further, once measurement in service has begun, if proving difficulties and especially chronic failures to meet the proving repeatability standards occur, there are many potential causes to consider if the true root cause is to be remedied. Due to numerous unforeseen factors, the expected flow noise level and the corresponding TPT needed to pass repeatability requirements might vary considerably from the TPT predicted in the design phase.

As a sizing and selection tool, TPT has only been based on assumptions and estimates of the potential meter flow noise under the expected process conditions. However, present embodiments provide methods and apparatuses that analyze continuous live flow rate measurements from a flowmeter, while in service, to determine and indicate the needed TPT based on actual current conditions, and thus an advance in the art is realized.

SUMMARY

A method for operating a flowmeter diagnostic tool is provided according to an embodiment. The diagnostic tool interfaces with a flowmeter sensor assembly, and a base prover volume (BPV) is input into the diagnostic tool. A desired number of passes per run is input into the diagnostic tool. Flowmeter data is received, and an estimated total prove time (TPT) necessary to pass a predetermined repeatability requirement is calculated. An estimated minimum number of runs needed to achieve the calculated TPT is calculated.

A method for operating a flowmeter diagnostic tool is provided according to an embodiment. The diagnostic tool interfaces with a flowmeter sensor assembly, and a maximum number of allowed runs is input into the diagnostic tool. A desired number of passes per run is input into the diagnostic tool. Flowmeter data is received, and an estimated total prove time (TPT) necessary to pass a predetermined repeatability requirement is calculated. An estimated minimum base prover volume (BPV) is calculated.

A diagnostic tool for configuring a flowmeter system is provided according to an embodiment. Electronics is configured to interface with a flowmeter (5) and receive flowmeter data. A user interface with the electronics is configured to accept a user input, wherein the input comprises at least one of a base prover volume (BPV), a desired number of passes per run, and maximum number of allowed runs. A processing system (303) is configured to run a proving routine (315), wherein the proving routine (315) is configured to at least one of calculate an estimated total prove time (TPT) necessary to pass a predetermined repeatability requirement, calculate an estimated minimum number of runs needed to achieve the calculated TPT, and calculate an estimated minimum base prover volume (BPV).

ASPECTS

According to an aspect, a method for operating a flowmeter diagnostic tool is provided. The diagnostic tool interfaces with a flowmeter sensor assembly, and a base prover volume (BPV) is input into the diagnostic tool. A desired number of passes per run is input into the diagnostic tool. Flowmeter data is received, and an estimated total prove time (TPT) necessary to pass a predetermined repeatability requirement is calculated. An estimated minimum number of runs needed to achieve the calculated TPT is calculated.

According to an aspect, a method for operating a flowmeter diagnostic tool is provided. The diagnostic tool interfaces with a flowmeter sensor assembly, and a maximum number of allowed runs is input into the diagnostic tool. A desired number of passes per run is input into the diagnostic tool. Flowmeter data is received, and an estimated total prove time (TPT) necessary to pass a predetermined repeatability requirement is calculated. An estimated minimum base prover volume (BPV) is calculated.

Preferably, a meter electronics with the flowmeter comprises the diagnostic tool.

Preferably, flowmeter data comprises a flow rate.

Preferably, the flow rate comprises an instantaneous flow rate.

Preferably, the instantaneous flow rate is a flow rate determined over a predetermined sampling window.

Preferably, calculating the TPT comprises utilizing an uncertainty coverage factor.

Preferably, calculating the estimated minimum number of runs needed to achieve the calculated TPT comprises utilizing a measured flow rate and a BPV.

Preferably, calculating the estimated minimum BPV needed to achieve the calculated TPT comprises utilizing a measured flow rate and a number of passes and/or runs.

According to an aspect, a diagnostic tool for configuring a flowmeter system is provided. Electronics is configured to interface with a flowmeter (5) and receive flowmeter data. A user interface with the electronics is configured to accept a user input, wherein the input comprises at least one of a base prover volume (BPV), a desired number of passes per run, and maximum number of allowed runs. A processing system (303) is configured to run a proving routine (315), wherein the proving routine (315) is configured to at least one of calculate an estimated total prove time (TPT) necessary to pass a predetermined repeatability requirement, calculate an estimated minimum number of runs needed to achieve the calculated TPT, and calculate an estimated minimum BPV.

Preferably, the electronics comprise meter electronics (20) for the flowmeter (5).

Preferably, flowmeter data comprises a flow rate.

Preferably, the flow rate comprises an instantaneous flow rate.

Preferably, the instantaneous flow rate is a flow rate determined over a predetermined sampling window.

Preferably, calculating the TPT comprises utilizing an uncertainty coverage factor.

Preferably, calculating the estimated minimum number of runs needed to achieve the calculated TPT comprises utilizing a measured flow rate and a BPV.

Preferably, calculating the estimated minimum BPV needed to achieve the calculated TPT comprises utilizing a measured flow rate and a number of passes and/or runs.

BRIEF DESCRIPTION OF THE DRAWINGS

The same reference number represents the same element on all drawings. It should be understood that the drawings are not necessarily to scale.

DETAILED DESCRIPTION

FIGS. 1-4 and the following description depict specific examples to teach those skilled in the art how to make and use the best mode of embodiments disclosed below. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the disclosed methods. As a result, the embodiments described below are not limited to the specific examples described below.

Figure 1:
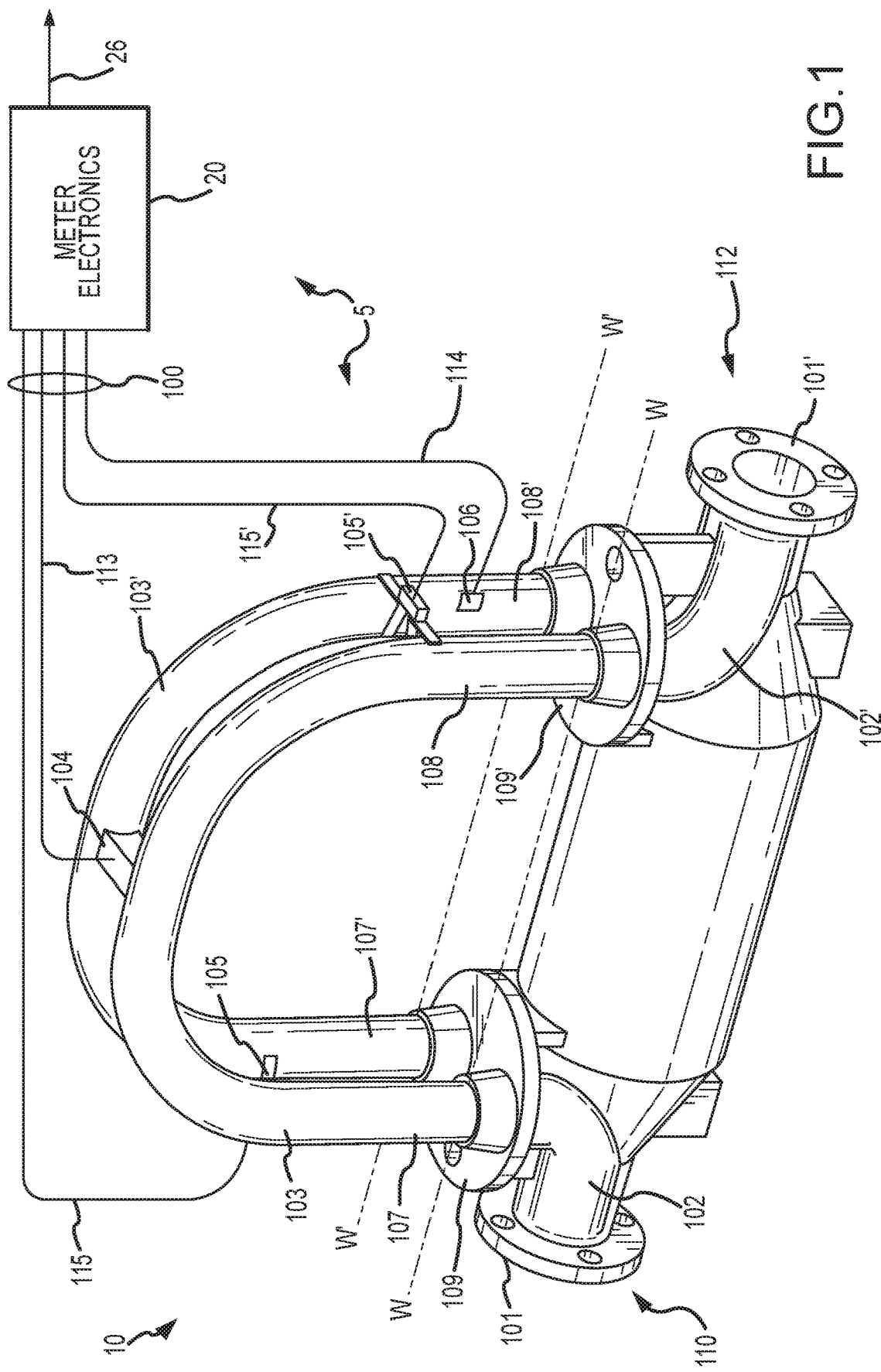
FIG. 1 illustrates a flowmeter according to an embodiment.

The methods described herein may be integrated into a flowmeter or may be performed using a dedicated diagnostic tool that interfaces with flowmeters and flow systems. FIG. 1 illustrates a flowmeter 5, which can be any vibrating meter, such as a Coriolis flowmeter/densitometer, for example without limitation. The flowmeter 5 comprises a sensor assembly 10 and meter electronics 20. The sensor assembly 10 responds to mass flow rate and density of a process material. Meter electronics 20 are connected to the sensor assembly 10 via leads 100 to provide density, mass flow rate, and temperature information over path 26, as well as other information. The sensor assembly 10 includes flanges 101 and 101', a pair of manifolds 102 and 102', a pair of parallel conduits 103 (first conduit) and 103' (second conduit), a driver 104, a temperature sensor 106 such as a resistive temperature detector (RTD), and a pair of pickoffs 105 and 105', such as magnet/coil pickoffs, strain gages, optical sensors, or any other pickoff known in the art. The conduits 103 and 103' have inlet legs 107 and 107' and outlet legs 108 and 108', respectively. Conduits 103 and 103' bend in at least one symmetrical location along their length and are essentially parallel throughout their length. Each conduit 103, 103', oscillates about axes W and W', respectively.

The legs 107, 107', 108, 108' of conduits 103,103' are fixedly attached to conduit mounting blocks 109 and 109' and these blocks, in turn, are fixedly attached to manifolds 102 and 102'. This provides a continuous closed material path through the sensor assembly 10.

When flanges 101 and 101' are connected to a process line (not shown) that carries the process material that is being measured, material enters a first end 110 of the flowmeter 5 through a first orifice (not visible in the view of FIG. 1) in flange 101, and is conducted through the manifold 102 to conduit mounting block 109. Within the manifold 102, the material is divided and routed through conduits 103 and 103'. Upon exiting conduits 103 and 103', the process material is recombined in a single stream within manifold 102' and is thereafter routed to exit a second end 112 connected by flange 101' to the process line (not shown).

Conduits 103 and 103' are selected and appropriately mounted to the conduit mounting blocks 109 and 109' so as to have substantially the same mass distribution, moments of inertia, and Young's modulus about bending axes W-W and W'-W', respectively. Inasmuch as the Young's modulus of the conduits 103, 103' changes with temperature, and this change affects the calculation of flow and density, a temperature sensor 106 is mounted to at least one conduit 103, 103' to continuously measure the temperature of the conduit. The temperature of the conduit, and hence the voltage appearing across the temperature sensor 106 for a given current passing therethrough, is governed primarily by the temperature of the material passing through the conduit. The temperature-dependent voltage appearing across the temperature sensor 106 is used in a well-known method by meter electronics 20 to compensate for the change in elastic modulus of conduits 103, 103' due to any changes in conduit 103, 103' temperature. The temperature sensor 106 is connected to meter electronics 20.

Both conduits 103, 103' are driven by driver 104 in opposite directions about their respective bending axes W and W' at what is termed the first out-of-phase bending mode of the flowmeter. This driver 104 may comprise any one of many well-known arrangements, such as a magnet mounted to conduit 103' and an opposing coil mounted to conduit 103, through which an alternating current is passed for vibrating both conduits. A suitable drive signal is applied by meter electronics 20, via lead 113, to the driver 104. It should be appreciated that while the discussion is directed towards two conduits 103, 103', in other embodiments, only a single conduit may be provided, or more than two conduits may be provided. It is also within the scope of the present invention to produce multiple drive signals for multiple drivers, and for the driver(s) to drive the conduits in modes other than the first out-of-phase bending mode.

The meter electronics 20 may be coupled to a path 26 or other communication link. The meter electronics 20 may communicate density measurements over the path 26. The meter electronics 20 may also transmit any manner of other signals, measurements, or data over the path 26. In addition, the meter electronics 20 may receive instructions, programming, other data, or commands via the path 26.

Meter electronics 20 receive the temperature signal on lead 114, and the left and right velocity signals appearing on leads 115 and 115', respectively. Meter electronics 20 produce the drive signal appearing on lead 113 to driver 104 and vibrate conduits 103, 103'. Meter electronics 20 process the left and right velocity signals and the temperature signal to compute the mass flow rate and the density of the material passing through the sensor assembly 10. This information, along with other information, is applied by meter electronics 20 over path 26 to utilization means. An explanation of the circuitry of the meter electronics 20 is not needed to understand the present invention and is omitted for brevity of this description.

It should be appreciated that the description of FIG. 1 is provided merely as an example of the operation of one possible vibrating meter and is not intended to limit the teaching of the present invention. For example, a Coriolis flowmeter structure is described, but it will be apparent to those skilled in the art that the present invention could be practiced on a vibrating tube or fork densitometer without the additional measurement capability provided by a Coriolis mass flowmeter.

Figure 2:
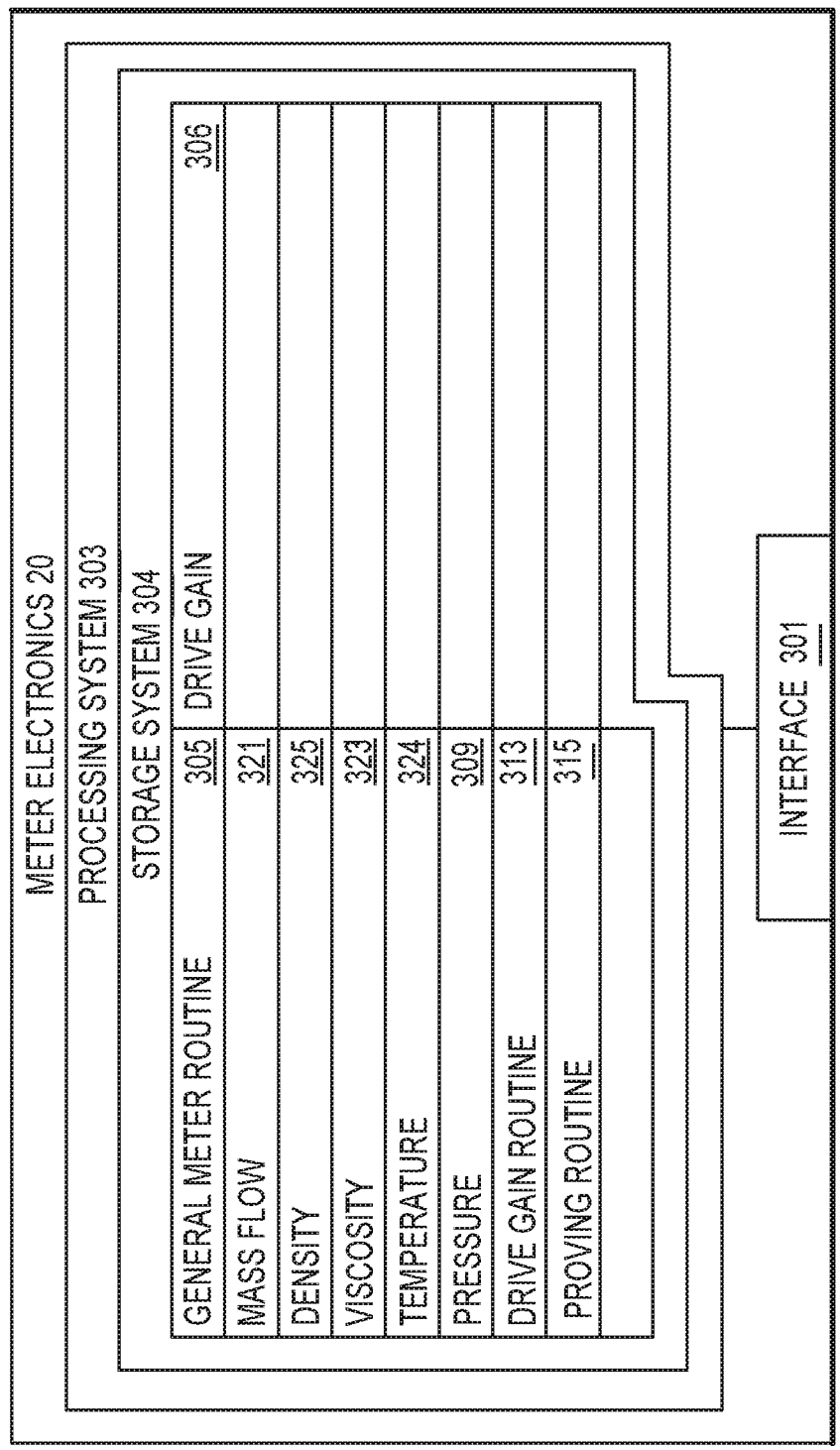
FIG. 2 illustrates an example of diagnostic electronics according to an embodiment.

FIG. 2 is a general block diagram of the meter electronics 20 according to an embodiment. It should be noted that electronics for a stand-alone diagnostic tool may have similar architecture. In operation, the flowmeter 5 provides various measurement values that may be outputted including one or more of a measured or averaged value of density, mass flow rate, volume flow rate, individual flow component mass and volume flow rates for multi-phase flow, and total flow rate, including, for example, both volume and mass flow of individual flow components. Meter electronics 20 and stand-alone electronics may comprise a user interface wherein a user may input data and/or receive outputted data.

The flowmeter 5 generates a vibrational response. The vibrational response is received and processed by the meter electronics 20 to generate one or more fluid measurement values. The values can be monitored, recorded, saved, totaled, and/or output.

The meter electronics 20 includes an interface 301, a processing system 303 in communication with the interface 301, and a storage system 304 in communication with the processing system 303. Although these components are shown as distinct blocks, it should be understood that the meter electronics 20 can be comprised of various combinations of integrated and/or discrete components.

The interface 301 may be configured to couple to the leads 100 and exchange signals with the driver 104, pickoff sensors 105, 105', and temperature sensors 106, for example. The interface 301 may be further configured to communicate over the communication path 26, such as to external devices.

The processing system 303 can comprise any manner of processing system. The processing system 303 is configured to retrieve and execute stored routines in order to operate the flowmeter 5. The storage system 304 can store routines including a general meter routine 305 and a drive gain routine 313. The storage system 304 can store measurements, received values, working values, and other information. In some embodiments, the storage system stores a mass flow (m) 321, a density (ρ) 325, a viscosity (μ) 323, a temperature (T) 324, a pressure 309, a drive gain 306, and any other variables known in the art. The routines 305, 313 may comprise any signal noted as well as other variables known in the art. Other measurement/processing routines are contemplated and are within the scope of the description and claims.

The general meter routine 305 can produce and store fluid quantifications and flow measurements. These values can comprise substantially instantaneous measurement values or can comprise totalized, accumulated, and/or averaged values. For example, the general meter routine 305 can generate mass flow measurements and store them in the mass flow 321 storage of the storage system 304, for example. Similarly, the general meter routine 305 can generate density measurements and store them in the density 325 storage of the storage system 304, for example. The mass flow 321 and density 325 values are determined from the vibrational response, as previously discussed and as known in the art. The mass flow and other measurements can comprise a substantially instantaneous value, can comprise a sample, can comprise an averaged value over a time interval, or can comprise an accumulated value over a time interval. The time interval may be chosen to correspond to a block of time during which certain fluid conditions are detected, for example, a liquid-only fluid state, or alternatively, a fluid state including liquids, entrained gas, and/or solids, solutes, and combinations thereof. In addition, other mass and volume flow and related quantifications are contemplated and are within the scope of the description and claims.

Embodiments provided comprise a diagnostic tool capable of indicating the estimated minimum TPT need for a flowmeter based on actual observed conditions in service, and thus is useful in determining the root cause and the best course of action to take to resolve proving failures. In an embodiment, the diagnostic tool comprises meter electronics 20 having a proving routine 315 that determines minimum TPT. Other embodiments of the diagnostic tool are separate from meter electronics but may communicate with a flowmeter system meter electronics 20 by the interface 301.

Depending on what the indicated minimum TPT need is based upon the actual operating conditions, the simplest solution may be to increase the number of runs and/or passes to achieve the indicated TPT target. In contrast, if the diagnostic tool indicates that the needed increase to the TPT to achieve the TPT target is so dramatic that it would be impractical to implement, then other solutions may be sought that would cause the system flow noise, and therefore, the indicated TPT target to be decreased to an achievable and/or practical level. As changes are made to reduce the flow noise, the TPT diagnostic tool can be monitored to provide instantaneous feedback on the efficacy of the different improvements as they are applied, thus validating corrective actions as they are implemented.

The diagnostic tool is also especially valuable whenever contracting to prove with a portable prover or planning to upgrade a stationary prover to a larger size to increase capacity. With the flowmeter installed and operating, the TPT diagnostic may be observed at a previously untested flow rate prior to the arrival of the prover to verify in situ a reasonable expectation for whether the proving repeatability requirements will be met at the new flow rate or under the new conditions with a practical number of passes and/or runs using the prover size that is planned. If indicated by the TPT diagnostic, a proving contractor could be directed in advance to bring an appropriately sized prover, or a planned capacity upgrade design could be adjusted accordingly in accordance with the data.

Field experience and testing have demonstrated that there is good correlation for certain Coriolis flow meter designs between the TPT and the probability of successfully meeting the API MPMS Chapter 4.8 requirements for repeatability. TPT is defined by the Equation 1.

$$TPT = BPV/(\text{Flow Rate}) \times PPR \times n \quad (1)$$

Where:
TPT=Total prove time.
Flow Rate=the average or set-point flow rate of the system during the prove.
BPV=Base Prover Volume.
PPR=Passes per run.
n=Total number of runs.

The TPT is the total accumulated time that the displacer of the prover has been travelling between the prover detector switches while pulses from the meter were being accumulated during a prove.

The BPV is the total calibrated volume displaced by the prover during each pass of the prover displacer while pulses from the meter are being accumulated.

PPR is the total number of passes per each proving run during a prove. When multiple passes per run are measured, the resulting volume measurement for that run is the average of all the passes taken during that run.

The total number of runs (n) is the number of runs that are analyzed to determine the outcome of a prove. The number of runs also dictates the repeatability tolerance that will apply for the prove in accordance with chosen standards.

In an embodiment, the diagnostic tool determines a TPT target by applying standard statistical analysis to measure the variation of the instantaneous flow rate indicated by the flowmeter. Statistical calculations are used to compute the ongoing standard deviation of the flow rate data captured over the most recent sample window. The standard deviation value is updated continuously by repeating the sample process on an ongoing basis and computing a new standard deviation as each subsequent sample window is completed. The sample window duration is a configurable value, so that it can be adjusted to optimize performance of the TPT diagnostic. For example, if the sample period duration is configured as 5 seconds, then the standard deviation value will always represent the standard deviation of the full set of flow rate samples gathered over the last 5 seconds at the standard sampling rate for the transmitter. The sampling window may be a time value that is predetermined by the operator.

The minimum TPT target for successful proving is calculated from the standard deviation as shown in Equation 2.

$$TPT_m = \left(\frac{k \times \sigma}{U_{MF}}\right)^2 / MSF \quad (2)$$

Where:
$TPT_m$=Estimated minimum Total Prove Time in seconds.
k=Uncertainty coverage factor (e.g., k=2 is equivalent to 95% confidence).
$\sigma$=Observed current (short term) standard deviation of the live meter flow rate indication in %.
$U_{MF}$=Target Meter Factor uncertainty in %.
MSF=Meter-specific factor.

The $TPT_m$ is the prove time estimated needed to pass predetermined repeatability standard to achieve a meter factor uncertainty of $U_{MF}$ with a coverage factor of k, while proving when the meter continuous flow rate sampling indicates a standard deviation of $\sigma$ for the instantaneous flow rate.

The MSF is the factor necessary to convert apparent number of samples (n) from the meter a sampling rate into seconds of proving time.

By way of example only, in accordance with API MPMS Chapter 4.8, the $U_{MF}$ would be set to 0.027%, and the MSF may, for some Coriolis flow meters be set to 26.5. Therefore, Equation 2 would be calculated as follows:

$$TPT = \left(\frac{2 \times \sigma}{0.027}\right)^2 / 26.5$$

The embodiments of a diagnostic tool indicate in either units of TPT (seconds), the total number of passes (by count), and/or the total number of runs (by count) needed to pass repeatability requirements.

To indicate the total number of passes needed, a BPV value must be recorded in the device. The total number of passes is calculated from the BPV and the measured flow rate as shown in Equation 3.

$$\text{Total passes} = TPT_{Diag} \times \frac{\text{Flow Rate}}{BPV} \quad (3)$$

Where:
Total passes=the total number of passes needed, whether they are grouped and averaged into multi-pass runs, or kept individually as runs.
$TPT_{Diag}$=The Total Prove Time diagnostic value as calculated by the invention.
BPV=Base Prover Volume value recorded in the meter configuration.
Flow Rate=the instantaneous flow rate measured by the meter.

To indicate the total number of runs needed, a BPV value and the passes per run value must be recorded in the device. The total number of runs needed is calculated from the BPV, the passes per run, and the measured flow rate as shown in Equation 4.

$$\text{Total runs} = TPT_{Diag} \times \frac{\text{Flow Rate}}{(\text{Passes per run} \times BPV)} \quad (4)$$

Where:
Total runs=the total number of runs needed to expect to pass repeatability.
$TPT_{Diag}$=The Total Prove Time diagnostic value as calculated by the invention.
BPV=Base Prover Volume value recorded in the meter configuration.
Passes per run=the number of passes averaged per each proving run during a prove.

Figure 3:
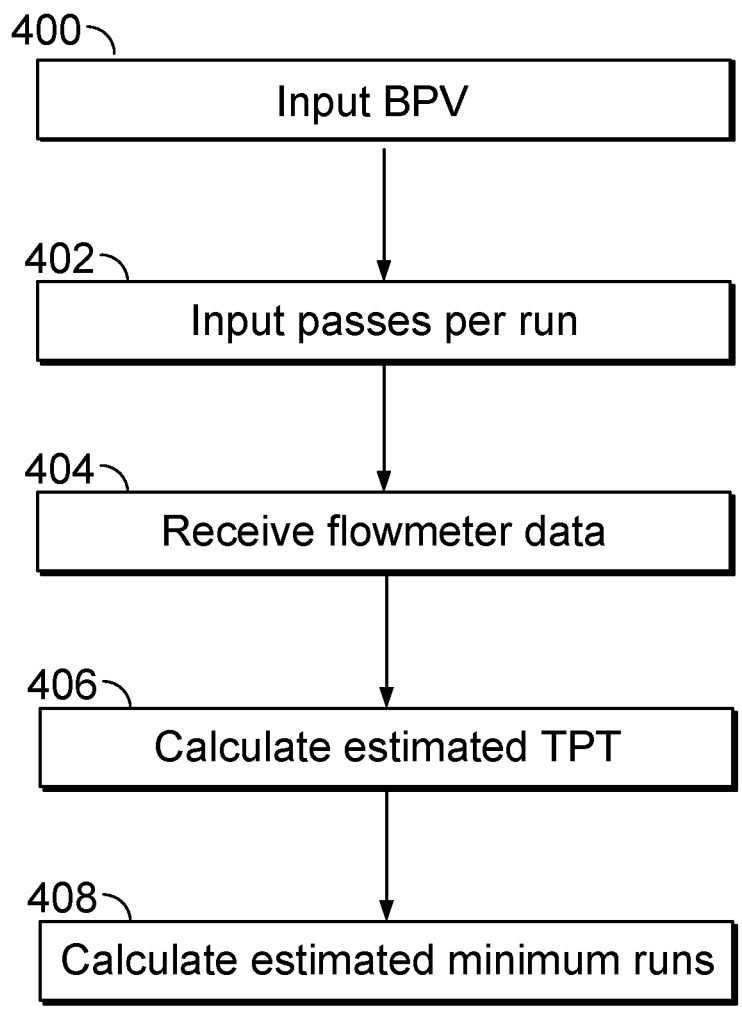
FIG. 3 is a flow chart illustrating a method of operating a flowmeter diagnostic tool according to an embodiment.

FIG. 3. Illustrates an embodiment of operating the diagnostic tool that allows an operator to enter the base prover volume (BPV) (400) and the number of passes per run (402). Flowmeter data is received by the diagnostic tool (404). The flowmeter data may include flow rates, operating conditions, fluid properties, and other meter data. Some examples of flowmeter data include, but are not limited to, mass flow, volume flow, density, viscosity, temperature, pressure, drive gain, and uncertainty coverage factor. These values may be instantaneous or may be averaged over a sample range and/or time period. The diagnostic tool then calculates live indications of the estimated TPT (406) and the minimum runs needed to achieve the TPT (408) given the current conditions and the entered values for the BPV and passes per run. These data may also be output.

Figure 4:
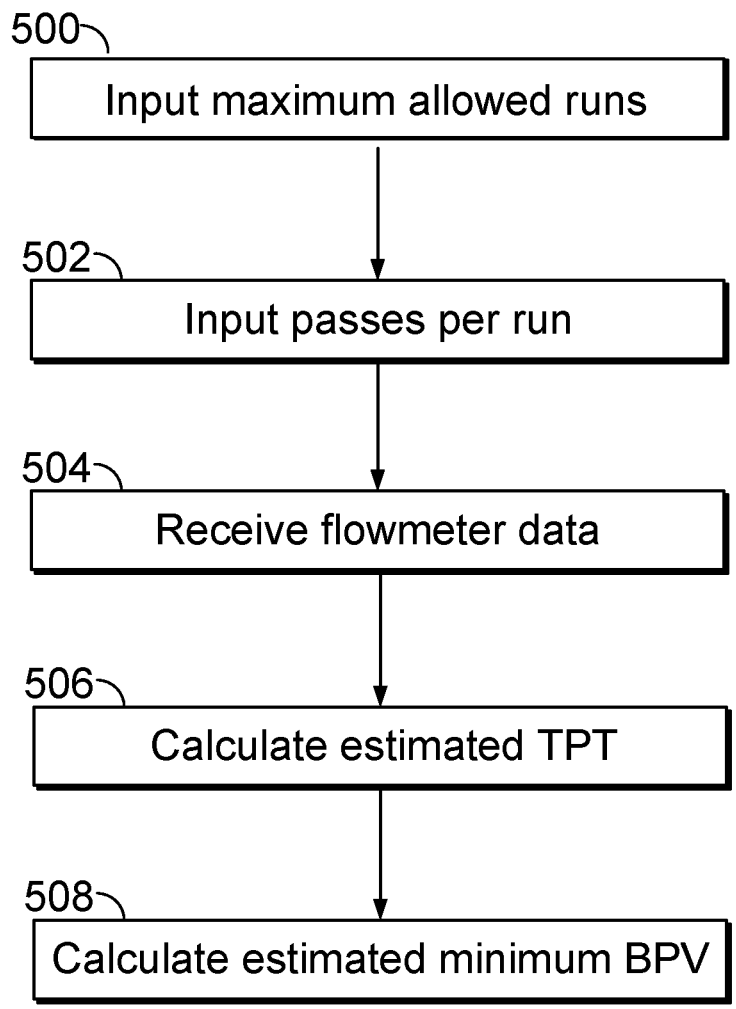
FIG. 4 is a flow chart illustrating a method of operating a flowmeter diagnostic tool according to another embodiment.

FIG. 4. Illustrates an embodiment of operating the diagnostic tool that allows an operator to enter the maximum allowed number of runs (500) and the number of passes per run (502). Flowmeter data is received by the diagnostic tool (504). The flowmeter data may include flow rates, operating conditions, fluid properties, and other meter data. Some examples of flowmeter data include, but are not limited to, mass flow, volume flow, density, viscosity, temperature, pressure, drive gain, and uncertainty coverage factor. These values may be instantaneous or may be averaged over a sample range and/or time period. The diagnostic tool then calculates live indications of the estimated TPT (506) and the minimum BPV needed to achieve the TPT (508) given the current conditions and the entered values for the maximum allowed number of runs and passes per run. These data may also be output.

In the above embodiments, the flowmeter may comprise a diagnostic tool with the meter electronics. In an embodiment, the diagnostic tool may be a separate device from the flowmeter.

As detailed above, the TPT diagnostic increases the ease-of-use of flow meters with enhanced troubleshooting when proving problems arise. The TPT diagnostic tool also provides feedback that could be used in future system designs to optimize performance during proving of Coriolis flow meters. With these live indications, as shown in FIGS. 3 and 4, the operator may vary flow rates and system settings and conditions, even when they are not proving, to observe the impact that system setting changes have on the live TPT and other indicated values. This would provide simple, direct, and instantaneous feedback to test the effectiveness of different system operating tactics that are being considered with the goal of improving proving results.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

What is claimed is:

1. A method for operating a meter electronics comprising:
providing a Coriolis mass flowmeter comprising a sensor assembly in communication with a meter electronics, wherein the sensor assembly comprises a driver and a pair of pickoffs in communication with at least one flow conduit, and wherein the meter electronics is configured to provide a signal to the driver that induces vibrations in the at least one flow conduit, and receive a signal from the pickoffs during flowmeter operation;
interfacing a diagnostic tool with the meter electronics;
inputting a base prover volume (BPV) into the meter electronics;
inputting a desired number of passes per run into the meter electronics;
receiving, with the meter electronics, pickoff-derived flowmeter data from the Coriolis mass flowmeter;
calculating, with a proving routine of the diagnostic tool, an estimated total prove time (TPT) necessary to pass a predetermined repeatability requirement, wherein calculating the TPT comprises dividing an uncertainty coverage factor by a target meter factor uncertainty and utilizing the flowmeter data;
calculating an estimated minimum number of runs needed to achieve the calculated TPT;
operating the Coriolis mass flowmeter, with the meter electronics, for the minimum number of runs.

2. The method of claim 1, wherein the meter electronics with the Coriolis mass flowmeter comprises the diagnostic tool.

3. The method of claim 1, wherein flowmeter data comprises a flow rate.

4. The method of claim 3, wherein the flow rate comprises an instantaneous flow rate.

5. The method of claim 4, wherein the instantaneous flow rate is a flow rate determined over a predetermined sampling window.

6. The method of claim 1, wherein calculating the estimated minimum number of runs needed to achieve the calculated TPT comprises utilizing a measured flow rate and a BPV.

7. A method for operating a meter electronics comprising:
providing a Coriolis mass flowmeter comprising a sensor assembly in communication with the meter electronics, wherein the sensor assembly comprises a driver and a pair of pickoffs in communication with at least one flow conduit, and wherein the meter electronics is configured to provide a signal to the driver, and receive a signal from the pickoffs during Coriolis mass flowmeter operation;
interfacing a diagnostic tool with the meter electronics;
inputting a maximum number of allowed runs into the meter electronics;
inputting a desired number of passes per run into the meter electronics;
receiving, with the meter electronics, pickoff-derived flowmeter data from the Coriolis mass flowmeter;
calculating, with a proving routine of the diagnostic tool, an estimated total prove time (TPT) necessary to pass a predetermined repeatability requirement, wherein calculating the TPT comprises dividing an uncertainty coverage factor by a target meter factor uncertainty and utilizing the flowmeter data;
calculating, with the proving routine of the diagnostic tool, an estimated minimum base prover volume (BPV);
operating the Coriolis mass flowmeter, with the meter electronics, for the calculated TPT.

8. The method of claim 7, wherein calculating the estimated minimum BPV needed to achieve the calculated TPT comprises utilizing a measured flow rate and a number of passes and/or runs.

9. The method of claim 7, wherein the meter electronics with the Coriolis mass flowmeter comprises the diagnostic tool.

10. The method of claim 7, wherein flowmeter data comprises a flow rate.

11. The method of claim 10, wherein the flow rate comprises an instantaneous flow rate.

12. The method of claim 11, wherein the instantaneous flow rate is a flow rate determined over a predetermined sampling window.

13. The method of claim 7, wherein calculating the estimated minimum number of runs needed to achieve the calculated TPT comprises utilizing a measured flow rate and a BPV.

14. A meter electronics configured to operate a Coriolis flowmeter:
wherein the meter electronics interfaces with the Coriolis flowmeter, and wherein the Coriolis flowmeter comprises a sensor assembly further comprising a driver and a pair of pickoffs in communication with at least one flow conduit, and wherein the meter electronics is configured to provide a signal to the driver, and receive a signal from the pickoffs during Coriolis flowmeter operation;
a user interface with the meter electronics configured to accept a user input, wherein the input comprises at least one of a base prover volume (BPV), a desired number of passes per run, and maximum number of allowed runs;
a diagnostic tool in communication with the meter electronics, the diagnostic tool comprising a proving routine, wherein the proving routine is configured to at least one of calculate an estimated total prove time (TPT) necessary to pass a predetermined repeatability requirement, calculate an estimated minimum number of runs needed to achieve the calculated TPT, and calculate an estimated minimum base prover volume (BPV), wherein calculating the TPT comprises dividing an uncertainty coverage factor by a target meter factor uncertainty and utilizing the flowmeter data; and
wherein the meter electronics is further configured to operate the Coriolis flowmeter for at least one of the estimated total prove time (TPT), the estimated minimum number of runs, and the estimated minimum base prover volume (BPV).

15. The diagnostic tool of claim 14, wherein flowmeter data comprises a flow rate.

16. The diagnostic tool of claim 15, wherein the flow rate comprises an instantaneous flow rate.

17. The diagnostic tool of claim 16, wherein the instantaneous flow rate is a flow rate determined over a predetermined sampling window.

18. The diagnostic tool of claim 14, wherein calculating the estimated minimum number of runs needed to achieve the calculated TPT comprises utilizing a measured flow rate and a BPV.

19. The diagnostic tool of claim 14, wherein calculating the estimated minimum BPV needed to achieve the calculated TPT comprises utilizing a measured flow rate and a number of passes and/or runs.

20. The meter electronics of claim 14, wherein the meter electronics comprises the diagnostic tool.

* * * * *